June 19, 1962 C. H. WILLSEY 3,039,591
EGG HANDLING CONVEYOR FOR EGG BREAKING MACHINE
Original Filed Oct. 2, 1956 5 Sheets-Sheet 1
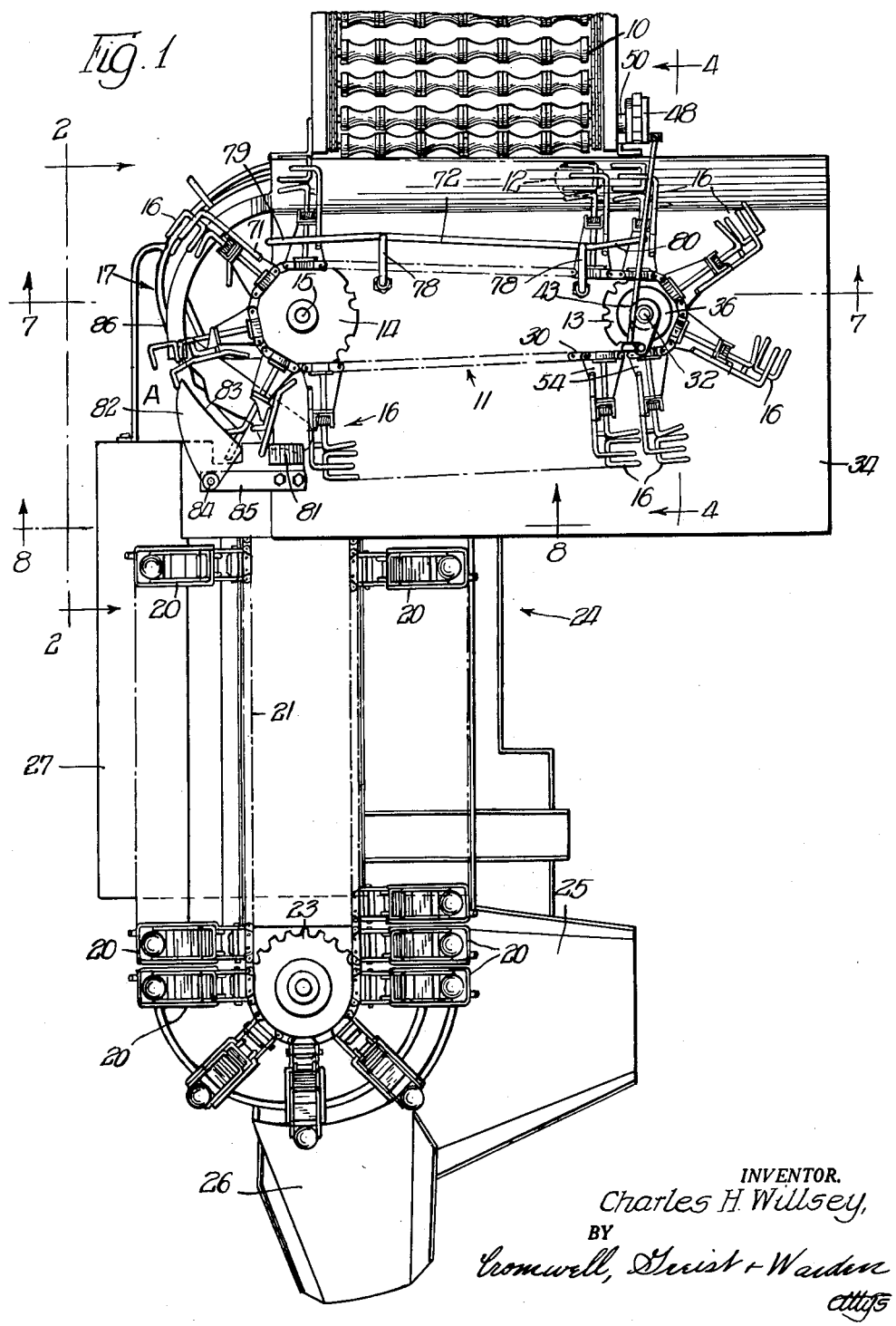
INVENTOR.
Charles H. Willsey,
BY
Cromwell, Greist + Warden
Attys

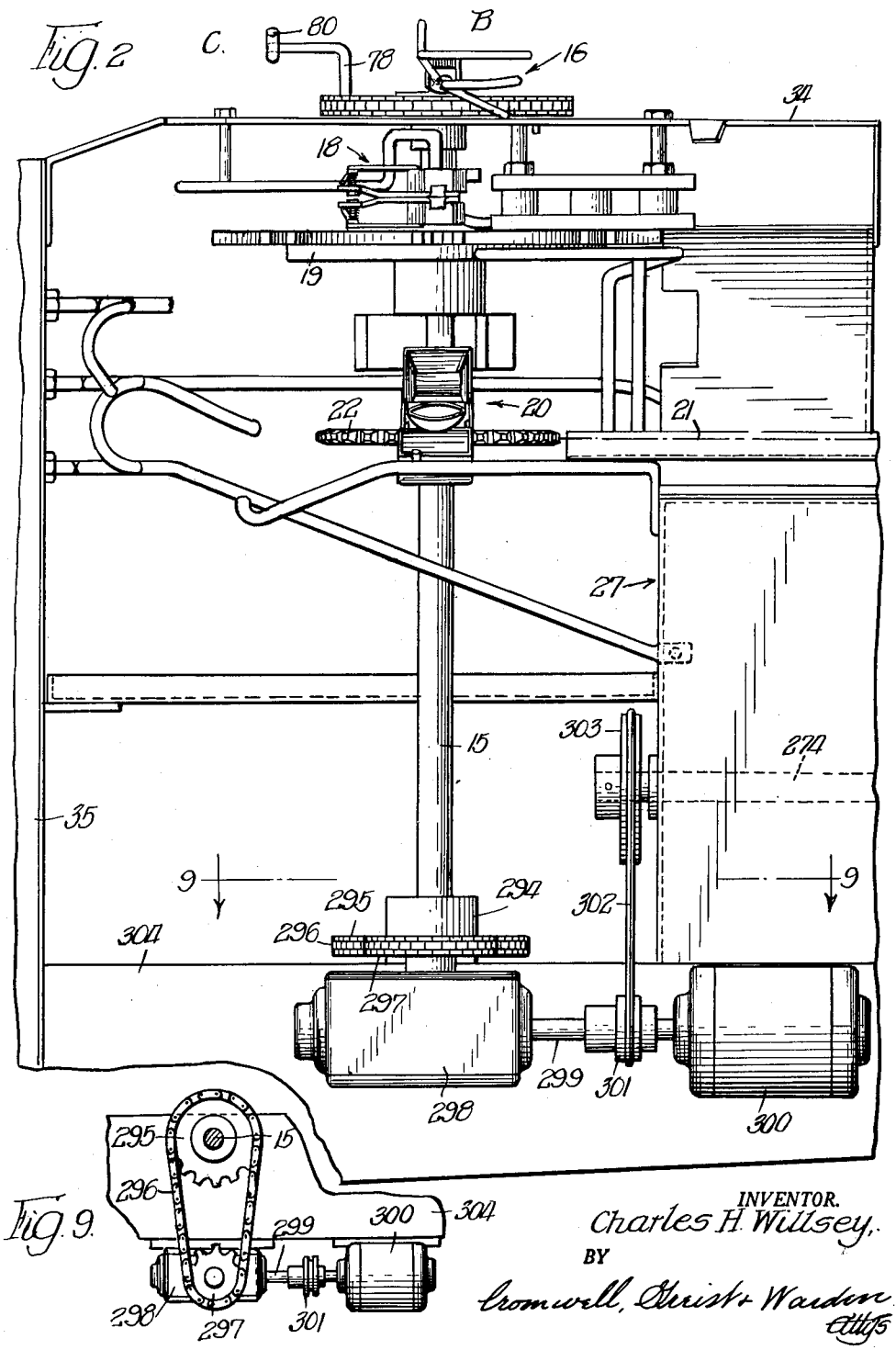

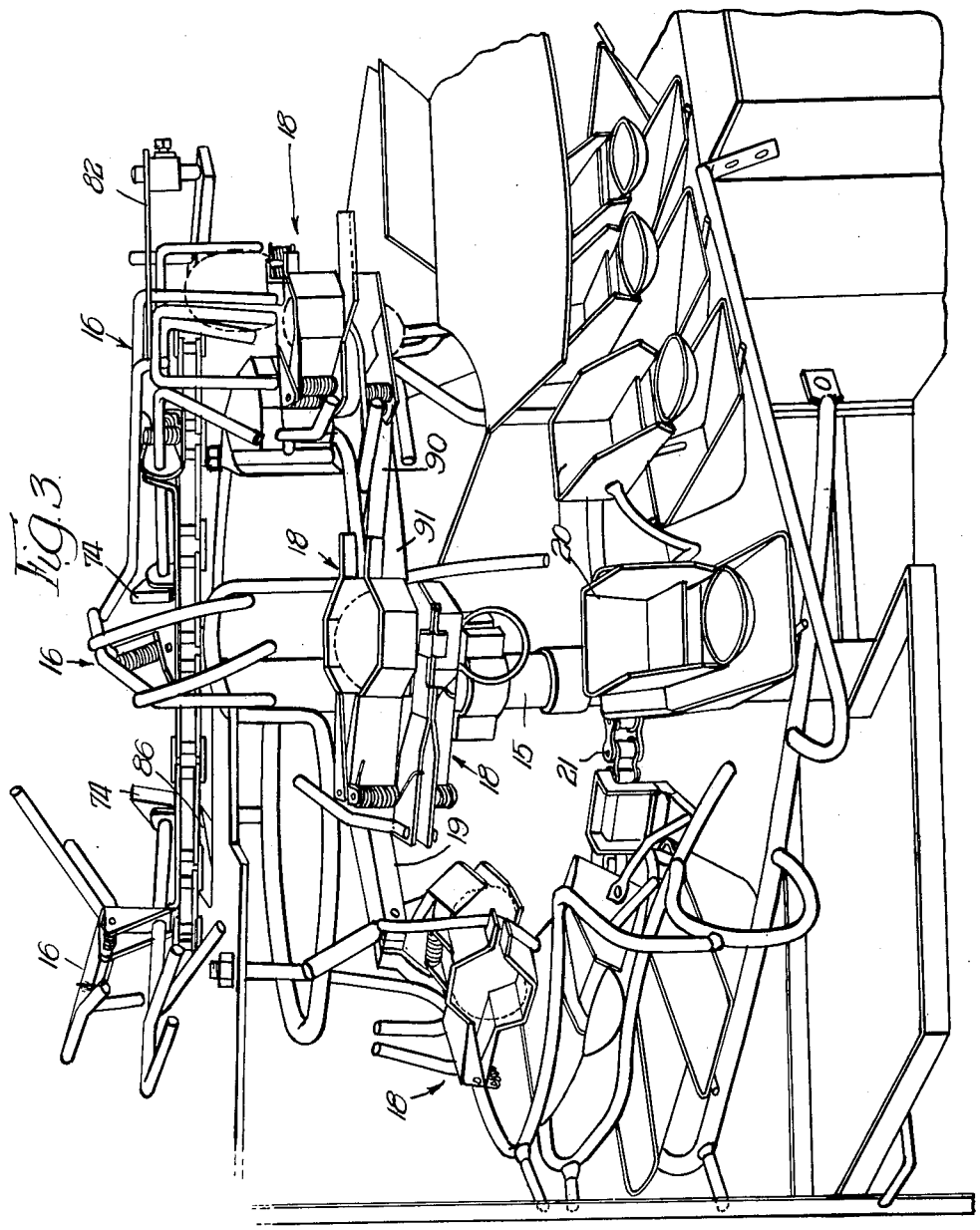

June 19, 1962     C. H. WILLSEY     3,039,591
EGG HANDLING CONVEYOR FOR EGG BREAKING MACHINE
Original Filed Oct. 2, 1956     5 Sheets-Sheet 4
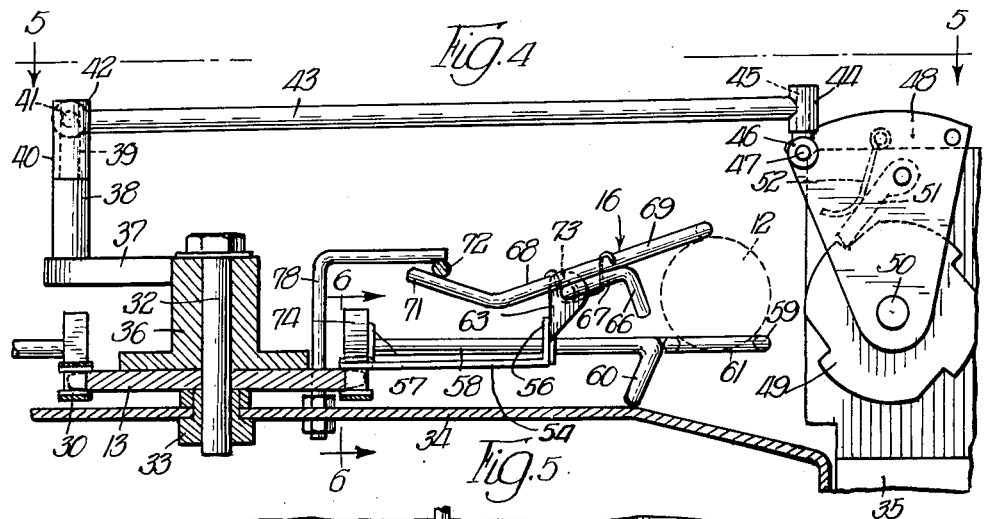
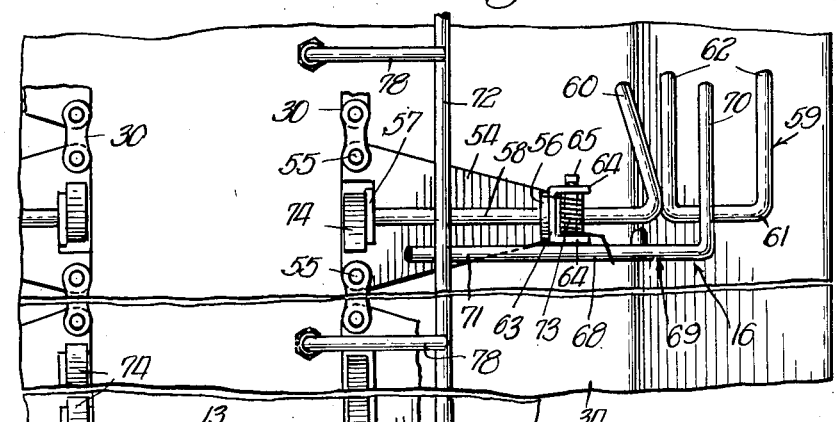
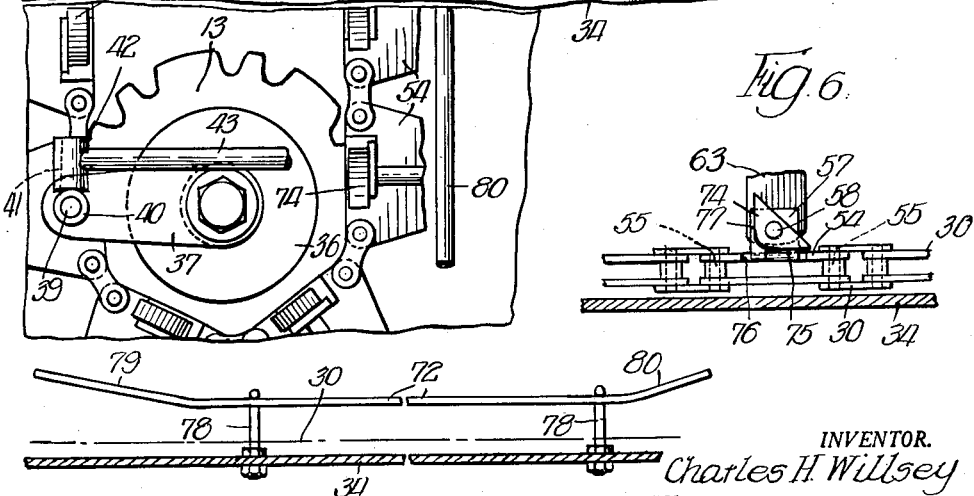
INVENTOR.
Charles H. Willsey
BY
Cromwell, Christ & Warden
Attys.

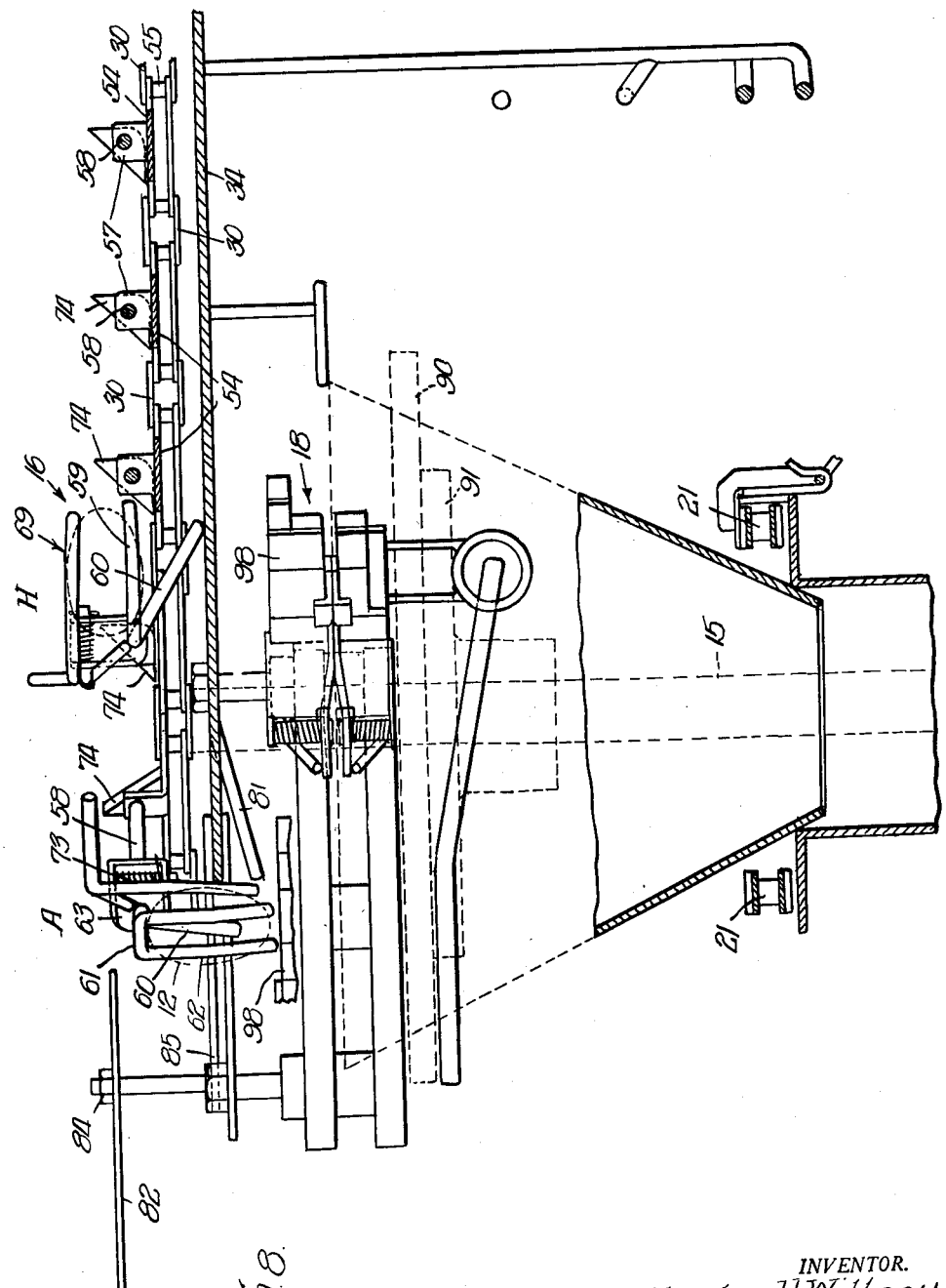

United States Patent Office 3,039,591
Patented June 19, 1962

3,039,591
EGG HANDLING CONVEYOR FOR EGG
BREAKING MACHINE
Charles H. Willsey, 1717 E. 37th St., Topeka, Kans.
Original application Oct. 2, 1956, Ser. No. 613,498.
Divided and this application Oct. 6, 1960, Ser. No.
60,870
9 Claims. (Cl. 198—33)

This invention relates to egg handling apparatus and is more particularly concerned with improvements in a machine having mechanism for feeding eggs to a series of devices for cracking or breaking successive eggs and separating the broken shell portions so as to deliver the contents therefrom into traveling cup mechanisms which are operated to separate the yolks from the whites.

This application is a division of Serial No. 613,498, filed October 2, 1956, now Patent No. 2,966,184, to which reference may be had for details not hereinafter described.

It is a general object of the present invention to provide an improved egg feeding mechanism for an egg cracking machine having mechanism for automatically cracking or breaking the shells of the successive eggs and delivering the contents thereof from the broken shells to successive receptacles which are carried on a separating conveyor, with the latter having associated therewith mechanism for advancing the successive receptacles while simultaneously separating the yolks from the whites, and with adequate provisions for handling the eggs rapidly and efficiently and for maintaining the machine and the product thereof in a sanitary condition.

It is a more specific object of the invention to provide in an egg cracking machine a transfer mechanism for delivering a plurality of eggs which are initially arranged in row formation, from a supply conveyor to a continuously moving feed conveyor on the cracking machine, with the eggs being delivered to the feed conveyor for advancing movement thereby in single file relation.

These and other objects of the invention will be apparent from a consideration of the egg handling apparatus which is shown by way of illustration in the accompanying drawings wherein:

FIG. 1 is a plan view, of an egg breaking machine having a feeding mechanism embodying the principal features of the invention, with portions being broken away or omitted;

FIG. 2 is an elevation, on a larger scale, of one side of the machine, with portions of the mechanism being broken away or omitted;

FIG. 3 is a perspective view, to a larger scale, of portions of the mechanism shown in FIG. 2;

FIG. 4 is a cross section taken on the line 4—4 of FIG. 1, on an enlarged scale and with portions broken away;

FIG. 5 is a partial plan view, taken on the line 5—5 of FIG. 4;

FIG. 6 is a cross section taken on the line 6—6 of FIG. 4, with portions broken away;

FIG. 7 is a fragmentary section, taken on the line 7—7 of FIG. 1, to an enlarged scale and with portions broken away;

FIG. 8 is a cross section, on an enlarged scale, taken on the line 8—8 of FIG. 1 with portions broken away; and FIG. 9 is a section taken on the line 9—9 of FIG. 2.

Referring particularly to FIGS. 1 to 3 of the drawings, the general arrangement of the several mechanisms which are incorporated in the machine and the manner in which they cooperate in the processing of the eggs will first be described briefly.

The machine preferably includes a shell egg supply mechanism in the form of an egg washing or cleaning device having an egg supporting endless conveyor 10 with the discharge or delivery end thereof positioned to deliver successive rows of 6 eggs each to a transfer or feed conveyor 11 for the cracking and separating machine, as shown in FIG. 1. The eggs, as indicated at 12, are delivered after passage through the washer to the endless chain feed conveyor 11 which is supported at its ends for movement in a horizontal path on the horizontally disposed end sprockets 13 and 14, the latter being mounted on the upper end of a vertical drive shaft 15 which constitutes the main driving member for the entire machine. The chain conveyor 11 carries a plurality of egg gripping or holding assemblies 16 for receiving the eggs 12 as they are delivered in row formation by the supply conveyor 10 and for advancing the eggs 12 in single row forming relation to a point adjacent the outer periphery of the end supporting sprocket 14 where the eggs are delivered to the cracking devices at the cracking station indicated at 17.

The eggs 12 are delivered, one by one, from the holding assemblies 16 on the conveyor 11 to cracking assemblies 18 which are carried around the periphery of a circular supporting frame or plate structure 19 mounted below the end sprocket 14 on the vertical power shaft 15. The cracking assemblies 18, to which the individual eggs 12 are delivered with the long axis of the same extending vertically, are constructed to engage the periphery of each successive egg and to advance the same in a circular path around the power shaft 15. The cracking assemblies 18 are pivotally connected to the periphery of the supporting frame plate 19 and are operated as they advance to crack the egg shell and then swing downwardly, as shown in FIG. 3, to a dumping position where they open up and separate the cracked shell into two portions or halves which allows the egg contents to drop by gravity into one of a plurality of separating devices 20 which are mounted in spaced relation on an endless separating conveyor 21, the latter having one end thereof supported on a horizontally disposed end sprocket 22 (FIG. 2) secured on the vertical power shaft 15 below the cracking head frame 19. The conveyor 21 has its other end supported on a horizontally disposed idler sprocket 23 and the movement of the same is timed to align the separating devices 20 below the cracking assemblies 18 as they pass around the end sprocket 22. The separating devices 20 are advanced by conveyor 21 past an operator at an inspection station indicated at 24 in FIG. 1, and the yolks and whites are separated by manipulation of the separating devices 20. Thereafter, the yolks and whites are delivered separately to chutes 25 and 26 and thence to collecting receptacles (not shown) for removal from the machine. Provision is made for dumping the contents, prior to separation of the yolks and whites, of any of the separating devices 20 into which the inspector finds a spoiled or inedible egg has been delivered or in which the yolk has been broken. A washing machine 27 is arranged along the return run of the conveyor 21 for cleaning and sterilizing the separating devices 20 from which broken yolks or spoiled egg meats have been removed.

The conveyor 10 of the shell egg washing machine is arranged for movement of its upper run in a generally horizontal path slightly above the path of operation of the horizontal feed or transfer conveyor 11 of the cracking machine so that each line of eggs 12 is delivered over the end of the conveyor 10 and received in spaced relation in the gripper assemblies 16 on the conveyor 11. The conveyor 11 (FIGS. 1, 3, 4 and 5) comprises an endless chain 30 which is carried on driven sprocket 14 and the idler sprocket 13. The sprocket 13 is secured on an upstanding stub shaft 32 which is journaled in a suitable bearing 33 mounted on the horizontal support plate 34, the latter forming the top of the main frame 35 of the machine. The sprocket 14 at the other end of the chain 30 is mounted on the upper end of the upright vertical power shaft 15. The sprocket 13 carries on its uppermost face a hub formation 36 to the upper end of which there is secured a radial arm 37 having at its outer end an upstanding post 38 with a reduced portion 39 at its upper end on which a vertical sleeve 40 is rotatably mounted. The sleeve 40 has a laterally extending pivot pin 41 which is received in the bore of the cross head 42 at the end of a pitman 43. At the other end the pitman 43 receives in the bore of the cross head 44 a pin 45 extending upwardly of a sleeve 46 which is mounted on a pin 47 extending laterally of a triangular shaped double plate bracket 48 which straddles a toothed wheel 49 secured on the end of a cross shaft 50 which supports one end of the conveyor 10. The frame-like bracket 48 is pivotally mounted on the end of the shaft 50 and carries a pivoted dog 51 between its side plates which is urged by its spring 52 in a direction to engage with the teeth in the wheel 49 when the bracket 48 is rotated in a counterclockwise direction by the movement of the pitman 43 to index the conveyor 10 and deliver a row of eggs 12 to the gripper assemblies 16 on the conveyor 11.

The gripper assemblies 16 are each mounted on the chain 30 by means of a generally triangular shaped support or base plate 54, which base plate is attached to the chain by pins 55 forming connecting pivots between the links of the chain. The base plate 54 is connected to the chain along a base forming edge and has an upstanding flange 56 at its outer apex forming end which cooperates with an upstanding flange or tongue member 57 at its base edge to provide bearing forming supports for a shaft-like inner arm or leg portion 58 of the bottom gripper member or clamp formation 59. The bearing support members 56 and 57 are apertured to rotatably support the shaft forming leg 58 which is integral with an outer angular end portion 60, the latter forming an angle somewhat less than 90° with the shaft portion 58 and in the normal egg receiving position, as shown in FIG. 4, extending downwardly at an angle to the horizontal so that its free end normally rests on the supporting frame plate 34. A U-shaped egg supporting member 61 is rigidly secured to the end of the shaft 58 at the juncture thereof with the outer end portion 60. The U-shaped member is positioned with its parallel legs 62 extending in the same general direction as the member 60 and is disposed horizontally in angled relation with the member 60 so that in the egg receiving position, as shown in FIGS. 4 and 5, it is generally parallel to the top surface of the frame plate 34, and the bent end member 60 angles downwardly therefrom in the direction of the trailing end of the member 61 for engagement with the top of the supporting plate member 34 whereby the U-shaped member 61 is supported in a horizontal position and receives an egg 12 from the conveyor 10 with the long axis of the egg extending generally parallel to the axis of the member. The shaft forming member 58 and the associated members form the bottom jaw member of the clamping assembly 16 for holding or gripping the eggs as they are forwarded by advancing movement of the conveyor chain 30. An upstanding bracket member 63 is secured to the shaft bearing member 56 which has its upper side edges bent outwardly into spaced parallel relation to form bearing ears 64 which support a laterally extending bearing shaft pivot pin member 65. The pivot member 65 forms one end of a rod-like bracket member which is bent to form three sections of approximately equal length, the opposite end section 66 depending in a generally vertical direction and extending transversely of the path of the chain 30 and the center connecting section 67 being at right angles to the end sections 65 and 66 and extending in the same transverse direction as the respective end sections. The center section 67 is secured to an intermediate portion of one leg 68 of an L-shaped arm 69 forming the upper clamp arm of the gripper assembly 16, the other leg 70 of the clamp arm 69 extending parallel to the pivot member 65 and spaced outwardly of the latter. In the egg clamping position, as shown in FIG. 4, the outer leg 70 of the clamp arm 69 is generally parallel to and spaced above the U-shaped egg supporting member 61. The leg 68 of the clamp arm or jaw member 69 terminates at its inner end in an upwardly bent portion 71 which forms a cam arm for engaging a cam bar 72 to control the swinging movement of the clamp arm 69 about its pivot 65. A torsion spring 73 is associated with the pivot member 65 and urges the clamp arm 69 in a clockwise direction, as viewed in FIG. 4, to bring the outer end 70 of the clamp arm 69 into clamping engagement with the egg 12 when the latter is positioned on the lower clamp member 61 of the gripper assembly.

The shaft portion 58 of the lower clamp jaw 59 is provided on its inner end with a triangular shaped stop plate or block member 74 (FIG. 6). The stop block 74 is positioned above the recess 76 which is cut in the end of the supporting plate 54 in forming the upstanding flange member 57 and rotates with the arm 58. In the position shown in FIG. 4 in which the eggs 12 are received from the conveyor 10 and in which the egg supporting U-shaped member 61 is in a generally horizontal position, the stop block member 74 has the lowermost one of its edges 75 resting at the end thereof on the top of the plate 54 adjacent the edge of the recess 76 with the adjoining edge 77 extending vertically at right angles thereto and facing in the trailing direction relative to the movement of the chain 30. The apex joining the two edges 75 and 77 is rounded on a radius which permits the shaft 58 to rotate about its longitudinal axis in its bearing supporting members 56 and 57 between two positions. In one position the edge 75 is engaged with the top of the plate 54 at one side of recess 76 and in the other the edge 77 is so engaged with the plate 54 at the other side of the recess 76, the angle of rotation of the assembly being approximately 90° in a clockwise direction as viewed from outboard of the conveyor 12. The position of the gripper assembly 16 when it is rotated is shown in FIG. 8 with the egg still being held between the U-shaped support portion 61 of the lower clamp member 59 and the arm 70 of the top clamp member 69. The opening and closing of the jaw forming members 59 and 69 of the assemblies 16 is controlled by the elongate cam bar or rail 72 which is supported above the frame plate 34 by angular upright brackets 78 spaced as shown in FIG. 1. The cam rail 72 has its ends 79 and 80 turned upwardly to engage and release the upwardly angled end portion 71 of the top clamp arm 69. The gripper assemblies 16 are, of course, held in the open position for delivery of the eggs 12 from the conveyor 10 and as each assembly 16 moves around the end sprocket 13, the cam arm 71 moves out from under the end 80 of the cam rail 72 and allows the torsion spring 73 to close the clamp arm 69 on the top of the egg 12 and hold the same firmly as the assembly 16 is advanced by the conveyor 30 to the cracking station 17 at the other end of the conveyor 30. As each gripper assembly 16 approaches the supporting sprocket 14 at the other end of the conveyor 30 it is held in a horizontal position by engagement of the depending arm 60 with the top of the frame plate 34. As each assembly 16 moves around the sprocket 14, the arm 60 moves down a ramp-like section 81 which is formed at the end of the plate 34 (FIG. 8), the weight of the egg and the position of the same relative to the axis of the rotatably mounted shaft 58 causing the assembly 16 to rotate about the axis of the shaft 58. As the assembly 16 is advanced beyond the end of the support plate 34, it rotates through an angle of 90° so that the egg carried thereby is positioned with its long axis in the vertical direction. A jaw releasing cam plate 82 having a curved cam edge 83 is supported on a vertically extending pin 84 on a bracket 85 secured at the end of the frame plate 34. As the gripper assembly 16 continues to advance around the sprocket 14, the end portion 70 of the top clamp arm 69 is engaged by the cam edge 83 and rotated sufficiently about the pivot member 65 to open up the clamp arms or jaw members 59 and 69 and release the egg 12 for gravity delivery to one of the cracking assemblies 18 which are carried on the supporting member 19 in spaced vertically aligned relation with the gripper assemblies 16 as they move around the vertical shaft 15. Continued advance of the gripper assembly 16 allows the clamp arms to close as the upper clamp arm 69 moves free of the cam plate 82, and causes subsequent rotation of the assembly and reopening of the arms of the same as the member 60 engages a curved extension 86 on the end of the frame plate 34 and the end member 71 of the top clamp arm 69 passes beneath the turned up end 79 of the cam rail 72. As the assembly 16 moves along the rear run of the conveyor chain 30 it is in proper opened up position to receive an egg 12 from the conveyor 10.

The vertically mounted power drive shaft 15 is supported in top and bottom bearings 293 and 294 (FIG. 2). A drive sprocket 295 is mounted on the shaft 15 adjacent the bottom bearing 294 and connected by a drive chain 296 with the output sprocket 297 of a change speed device 298. The input shaft 299 of the change speed device 298 is connected to the power shaft of a drive motor 300. A pulley 301 on the drive shaft 299 is connected by a drive belt 302 with a pulley 303 on the end of the power shaft 274 for operating the washing apparatus. The motor 300 and the change speed device 298 are mounted on a cross frame member 304 at the bottom of the machine, which also supports the bottom bearing 294 for the vertical power shaft 15.

In operating the machine the eggs are delivered by the conveyor 10 to the feed conveyor 11 and received in the holder assemblies 16, with the eggs being supplied in rows of 6 each as they come from a conventional shipping case, and preferably with the eggs being washed and sterilized while they are on the conveyor 10. Each egg is carried by a holder 16 to the delivery station A (FIGS. 1 and 8) where the holder assembly 16 is allowed to rotate about the axis of the shaft 58 when the holder arm 60 moves down the ramp 81 (FIG. 8) at the end of plate 34. The holder arm or jaw 69 engages with the cam plate 82 and opens the holder to allow the egg to drop by gravity into a cracking assembly 18 which is aligned below the feed holder assembly 16. As the holder assembly 16 passes the cam plate 82 the jaw 69 is released and the assembly is turned to its egg receiving position by engagement of the arm 60 with cam plate 86 and thereafter the arm 71 engages with cam rail 72 to open the jaw 69 for receiving an egg as it passes along the discharge end of conveyor 10.

I claim:

1. In an egg breaking machine having a series of egg cracking assemblies mounted in peripherally spaced relation on a rotatable head for movement in a generally horizontal path, an egg supply conveyor mounted for movement in a generally horizontal path, a plurality of egg gripping devices mounted on said supply conveyor in outwardly extending relation, said gripping devices each comprising a bottom clamp member and a cooperating top clamp member, said clamp members being pivotally connected to each other intermediate their ends and having opposed egg engaging members at the outer ends thereof, a bracket plate secured to said conveyor, said lower clamp member having its inner end mounted for rotation on said bracket, power means connected to said conveyor for operating the same in timed relation to the movement of said egg cracking assemblies and to align the egg gripping devices with successive cracking assemblies, means along said conveyor for controlling the pivotal movement of said upper clamp member relative to said lower clamp member to grip an egg between the outer end portions thereof, and means adjacent said cracking assemblies for rotating successive egg gripping devices to position the eggs therein with their long axis vertical for delivery to the cracking assemblies, and means for pivoting said upper clamp members to release the eggs therefrom.

2. In an egg breaking machine having a turret head mounted for movement about a vertical axis and a series of egg cracking assemblies mounted in peripherally spaced relation thereon, said cracking assemblies being adapted to receive eggs delivered thereto with the long axis extending generally vertical, an egg delivery conveyor mounted above said turret head, a series of egg gripping and carrying devices mounted on said conveyor for movement in a path above the path of movement of said cracking assemblies, means connected to the conveyor for operating the same to align the egg gripping and carrying devices thereon with successive egg cracking assemblies, said gripping and carrying devices comprising a supporting plate secured to said conveyor, a pair of pivotally connected arm members, said arm members having cooperating jaws at one end thereof for gripping an egg upon opening and closing movement of said jaws, one of said arm members being rotatably mounted at its other end on said supporting plate for movement about an axis extending normal to the path of movement of the conveyor, means adjacent said conveyor for holding the jaws of said gripping and carrying devices in an open position for receiving an egg between the same with the long axis thereof generally horizontal, means operative upon the gripping and holding devices for rotating the same when they are aligned with the egg cracking assemblies to position the eggs therein with the long axis generally vertical, and means adjacent the egg cracking assemblies for operating the arm members of successive gripping and holding devices to release the eggs therefrom for delivery to said egg cracking assemblies.

3. In an egg breaking machine having a turret head mounted for rotation about a vertical axis and a series of egg cracking assemblies mounted in peripherally spaced relation thereon, said cracking assemblies being adapted to receive eggs delivered thereto with the long axis extending generally vertical, an egg delivery conveyor mounted adjacent said turret head, a series of egg gripping and carrying devices mounted on said conveyor and extending outwardly thereof for movement in a path above and generally parallel to the path of movement of said cracking assemblies, means connected to the conveyor for operating the same to vertically align the egg gripping and carrying devices thereon with successive egg cracking assemblies, said gripping and carrying devices comprising a mounting plate secured to said conveyor, a pair of pivotally connected arm members, said arm members having cooperating jaws on one end thereof for gripping an egg upon opening and closing movement of said jaws, spring means urging said jaws toward closed position, one of said arm members being rotatably attached to said mounting plate for movement about an axis extending normal to the path of movement of the conveyor, means adjacent said conveyor for engaging the other arm member to move the same to an open position for receiving an egg therebetween with the long axis thereof generally horizontal, means for holding said devices in egg receiving position, said last mentioned means being interrupted to permit the devices to rotate when they are aligned with the egg cracking assemblies to position the eggs therein with the long axis generally vertical, and cam means adjacent the egg cracking assemblies for engaging an arm member of successive gripping and holding devices to release the eggs therefrom for delivery to said egg cracking assemblies.

4. In an egg breaking machine wherein a supporting frame is mounted for movement about a vertical axis and is provided with a series of egg cracking assemblies which are mounted in peripherally spaced relation thereon, said cracking assemblies being adapted to receive eggs delivered thereto with the long axis extending generally vertical, an egg delivery conveyor mounted above said turret head, a series of egg gripping and carrying devices mounted on said conveyor for movement in a path above the path of movement of said cracking assemblies, means connected to the conveyor and operating the same to align the egg gripping and carrying devices thereon with successive egg cracking assemblies, said gripping and carrying devices comprising a supporting plate secured to said conveyor and having upstanding bearing forming members, a pair of pivotally connected arm members having cooperating jaws at one end thereof for gripping an egg upon opening and closing movement of said jaws, one of said arm members comprising a shaft forming member journaled in said bearing forming members on said supporting plate for movement about an axis extending normal to the path of movement of the conveyor, means along said conveyor for holding the jaws of said gripping and carrying devices in an open position for receiving an egg between the same with the long axis thereof generally horizontal, said means being interrupted at said cracking assemblies to permit rotation of said devices to position the eggs therein with the long axis generally vertical, and means adjacent the egg cracking assemblies for moving the arm members of successive gripping and holding devices to release the eggs therefrom for delivery to said egg cracking assemblies.

5. In an egg breaking machine having a series of egg cracking assemblies mounted in peripherally spaced relation on a rotatable support, which support is mounted for movement about a generally vertical axis, an egg supply conveyor mounted for movement in a path above the path of said cracking assemblies, a plurality of egg gripping devices mounted on said supply conveyor in outwardly extending relation, said gripping devices each comprising a bottom clamp member and a cooperating top clamp member, said clamp members being pivotally connected to each other intermediate their ends and forming opposed jaw members for engaging eggs with the long axis thereof generally parallel with the conveyor, a bracket plate secured to said conveyor, said lower clamp member having its inner end mounted on said bracket plate for rotation about a horizontal, outwardly directed axis, power means connected to said conveyor for operating the same in timed relation to the movement of said egg cracking assemblies and to align the egg gripping devices above successive cracking assemblies, means for controlling the pivotal movement of the jaw members to grip an egg between the same, and means for rotating successive egg gripping devices to position the eggs therein with their long axis vertical for delivery to the cracking assemblies, and means for pivoting said upper clamp members to release the eggs therefrom.

6. In an egg breaking machine having a series of egg cracking assemblies mounted in peripherally spaced relation about a turret, which turret is supported for movement about a vertical axis, said cracking assemblies being adapted to receive eggs delivered thereto with the long axis extending generally vertical, an egg delivery conveyor mounted above said turret, a series of egg gripping and carrying devices mounted on said conveyor for movement in a horizontal plane, means connected to the conveyor for operating the same to align the egg gripping and carrying devices thereon with successive egg cracking assemblies, said gripping and carrying devices each comprising a supporting plate secured in outwardly extending relation on said conveyor, a pair of pivotally connected arm members, said arm members having cooperating jaws for gripping an egg upon opening and closing movement thereof, one of said arm members being rotatably mounted on said supporting plate for movement about an axis extending normal to the path of movement of the conveyor, means for holding the jaws of said gripping and carrying devices in an open position for receiving an egg between the same with the long axis thereof generally horizontal, and means for rotating the devices when they are aligned with the egg cracking assemblies to position the eggs therein with the long axis generally vertical for delivery to said egg cracking assemblies.

7. In an egg breaking machine having a series of egg cracking assemblies mounted in peripherally spaced relation on a turret, which turret is supported for rotational movement about a vertical axis, an egg delivery conveyor mounted above said cracking assemblies, a series of egg gripping and carrying devices mounted on said delivery conveyor and extending outwardly thereof for movement in a path above and generally parallel to the path of movement of said cracking assemblies, means connected to the conveyor for operating the same to vertically align the egg gripping and carrying devices thereon with successive egg cracking assemblies, said gripping and carrying devices each comprising a mounting member secured to said conveyor, a pair of pivotally connected arm members having cooperating jaws on one end thereof for gripping an egg upon opening and closing movement thereof, spring means urging said jaws toward closed position, one of said arm members being rotatably attached to said mounting member for movement about an axis extending normal to the path of movement of the conveyor, means for engaging the other arm member to move the same to an open position for receiving an egg with the long axis thereof generally horizontal, and means for supporting said devices in egg receiving position as they are advanced by the conveyor, said last mentioned means being interrupted to permit the devices to rotate when they are aligned with the egg cracking assemblies to position the eggs for delivery thereto with the long axis generally vertical.

8. In an egg handling machine, an egg delivery conveyor mounted for movement in a horizontal path, a series of egg gripping and carrying devices mounted on said conveyor, said gripping and carrying devices comprising a supporting plate secured to said conveyor and having upstanding bearing forming members, a pair of pivotally connected arm members having cooperating jaws for gripping an egg upon opening and closing movement thereof, one of said arm members comprising a shaft forming member journaled in said bearing forming members on said supporting plate for rotational movement about an axis extending outwardly of the path of movement of the conveyor, means for supporting said arm members with the jaws in an open position for receiving an egg between the same with the long axis thereof generally horizontal, said means being interrupted at a predetermined point along the path of the conveyor to permit rotation of said devices to position the eggs therein for discharge with the long axis generally vertical.

9. In an egg handling apparatus, a traveling conveyor mounted for movement in a horizontal path, a series of egg gripping devices on said conveyor, each of said devices being mounted for rotation on an axis extending outboard of said conveyor, each said device comprising a pair of jaw members pivotally connected to each other for opening and closing movement to grip an egg between the same, means for guiding said devices along a portion of the path of the conveyor with the jaws positioned for gripping the eggs with the long axis of the eggs extending in the direction of movement of the conveyor and means for rotating said devices to position the eggs with the long axis extending at right angles to the direction of movement of the conveyor.

References Cited in the file of this patent
UNITED STATES PATENTS
2,942,719   Bofinger _____ June 28, 1960